July 28, 1959  S. WISTOFT  2,896,934
WEIGHING SCALES
Filed Jan. 14, 1955  3 Sheets-Sheet 1
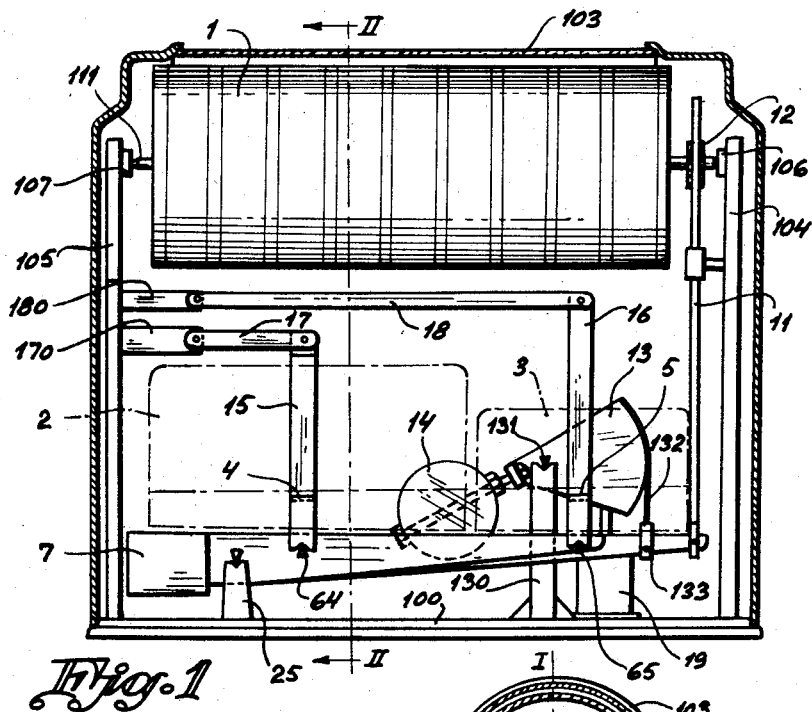
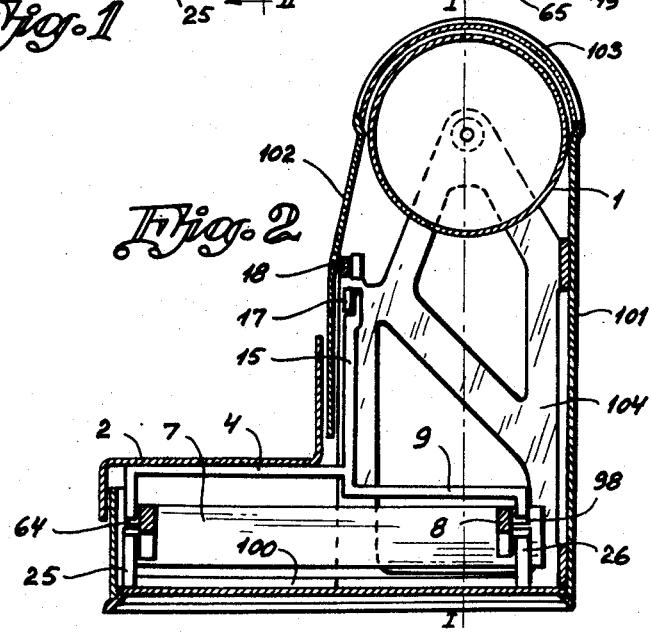
INVENTOR.
SOREN WISTOFT
BY
ATTORNEY

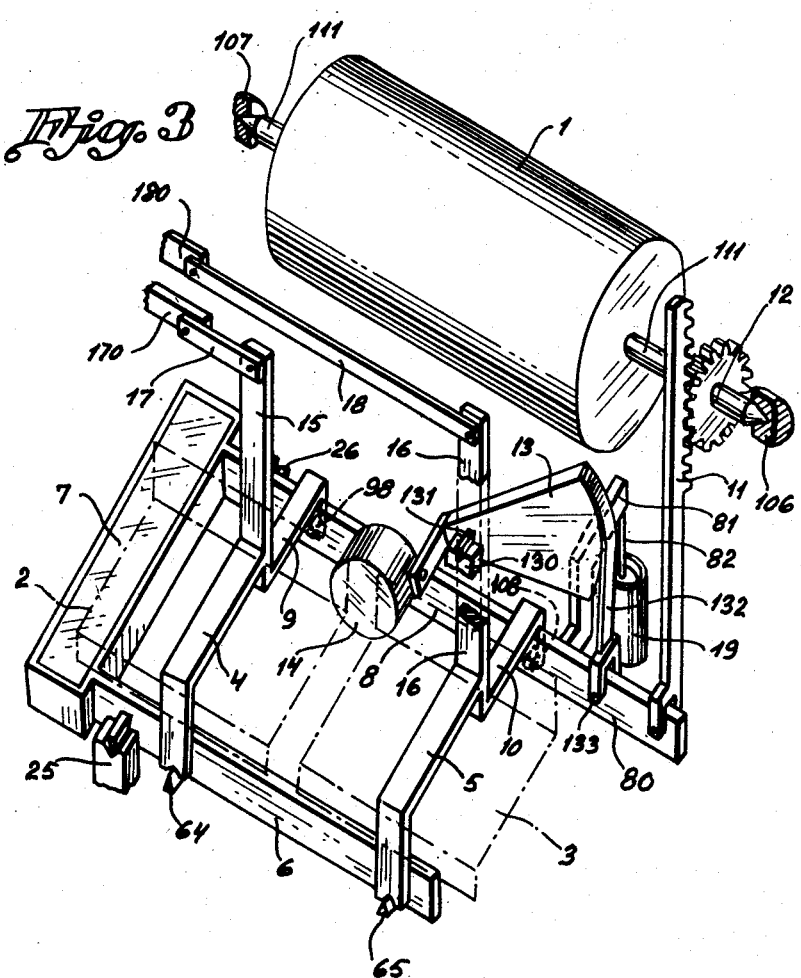

July 28, 1959  S. WISTOFT  2,896,934
WEIGHING SCALES
Filed Jan. 14, 1955  3 Sheets-Sheet 3
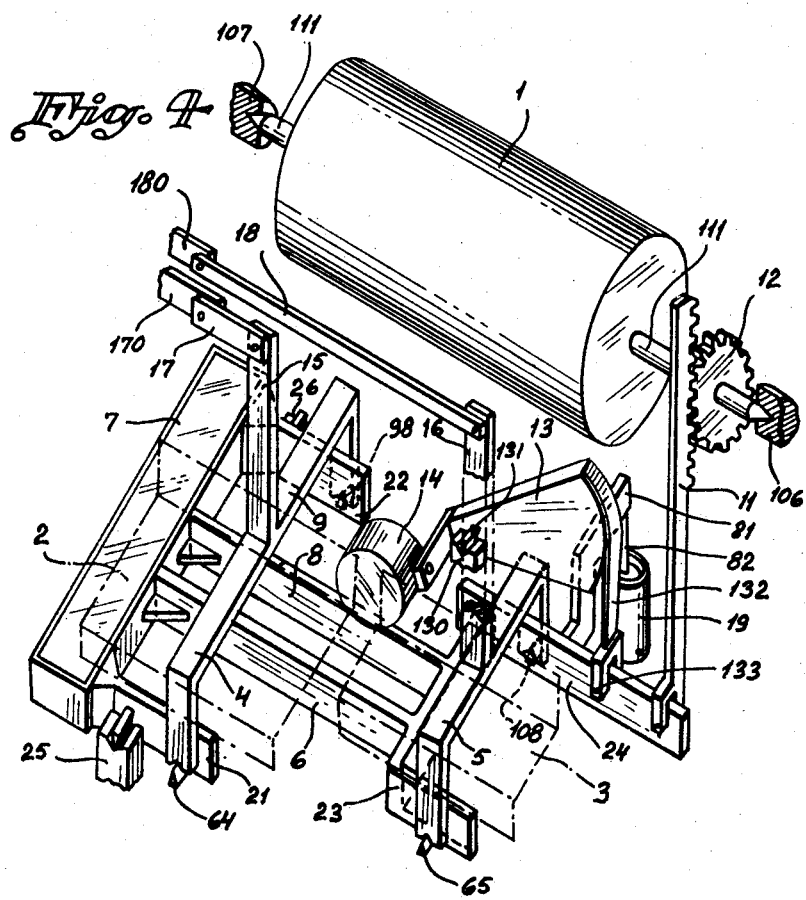
INVENTOR.
SOREN WISTOFT
BY
ATTORNEY United States Patent Office 2,896,934
Patented July 28, 1959

2,896,934
WEIGHING SCALES
Soren Wistoft, Copenhagen, Denmark
Application January 14, 1955, Serial No. 481,848
2 Claims. (Cl. 265—62)

This invention relates to weighing scales and in particular to automatic scales of the type comprising a pendulum operated main scale beam provided with a pair of pivotally supported weighing plates and an indicator drum bearing cost figures.

The main object of the invention is to provide an improved automatic scale of this kind in which the main elements of the weighing mechanism are arranged in such a manner as to reduce the dimensions of the scale to a minimum, while simultaneously providing for convenient reading of the indicator drum unimpaired by the objects placed on the weighing plates.

Another object of the invention is to provide improved means for supporting the weighing plates in a horizontal position without impairing the precision of the weighing mechanism or affecting the accessibility of the weighing plates.

Further objects will appear from the following description with reference to the drawings in which:

Fig. 1 is a vertical section taken along the line I—I in Fig. 2,

Fig. 2 is a sectional side view taken along the line II—II in Fig. 1,

Figs. 3 and 4 are perspective views showing the main parts of the weighing mechanism in two embodiments of the invention.

In the embodiments of the invention illustrated in the drawings 100 is a base plate, and 101 is the rear wall of a housing mounted along the rear edge of the base plate. 102 is the front wall of the housing in which a price reading drum 1 is pivotally mounted in bearings 106 and 107 mounted on a pair of brackets 104 and 105 respectively, the top wall of the housing being provided with a window 103 above the drum 1.

Mounted on the base plate 100 are a pair of brackets 25 and 26 forming knife edge bearings for the main scale beam comprising a front arm 6 and a rear arm 8 interconnected at one end by an elongated counterweight 7. The front arm 6 is provided with a pair of knife-edge bearings 64 and 65 for pivotally supporting the front ends 4 and 5 respectively of a pair of bracket members 4, 9 and 5, 10 respectively extending laterally across the main scale beam between the front and rear arms 6 and 8 respectively thereof. The bracket members which are likewise pivotally supported on the rear arm 8 by means of similar knife-edge bearings 98 and 108 respectively are adapted to support a pair of weighing plates 2 and 3 respectively so as to maintain these plates in a horizontal position throughout the weighing operation. For this purpose, the bracket members 4, 9 and 5, 10 are each provided with an upright 15 and 16 respectively mounted on the bracket members substantially at the middle thereof, i.e. substantially in the vertical median plane of the main scale beam. Each of the said uprights 15 and 16 is pivotally connected with a stay rod 17 and 18 respectively extending horizontally in the lengthwise direction of the scale and being pivotally connected with fixed elements 170 and 180 at the left hand side wall of the housing 101, 102.

The base plate 100 is further provided with upright bracket members 130 forming knife-edge bearings 131 for pivotally supporting a pendulum comprising a sector shaped arm 13 and a counterweight 14, the arm 13 being operatively connected with the main scale beam through a band 132 attached to the beam at a point 133 located at an extension 80 of the rear arm 8 of the main beam. The extension 80 is further linked with a toothed rod 11 engaging a pinion 12 on the shaft 111 of the drum 1 for transmitting the swinging movements of the main beam to a rotational movement of the drum 1. Furthermore, the extension 80 carries a bracket member 81 associated with a piston rod 82 of a dash pot 19.

In the embodiment illustrated in Fig. 4 the construction of the main beam is slightly modified in that the rear and front arms of the beam, 6 and 8 respectively, are located more closely to each other and are provided at one end with a laterally extending, substantially U-shaped bracket member 23, 24 carrying the knife-edge bearings 65 and 108 for the bracket member 5 supporting the weighing plate 3, the branch 24 of the member 23, 24 being associated with the band 132 and the toothed rod 11. Similarly, the other ends of the front and rear arms 6 and 8 are rigidly connected with the counterweight 7 and the latter is provided with a pair of longitudinally extending arms 21 and 22 respectively carrying the knife-edge bearings 64 and 98 respectively for the bracket member 4, 9 supporting the weighing plate 2.

As shown more clearly in Fig. 2, the arrangement according to the invention is such that all the elements of the weighing mechanism located between the rear wall 101 of the drum housing and the vertical median plane through the main scale beam in the lengthwise direction thereof are enclosed in the housing between the front wall 102 and the rear wall 101 and are disposed in the space of said housing below the drum 1. Thus, although the members 4, 9 and 5, 10 supporting and guiding the weighing plates 2 and 3 respectively are supported substantially at the middle, thereby providing for maximum precision of the weighing operation, the stay members are nevertheless enclosed in the housing and do not interfere with the accessibility of the weighing plates. Moreover, as a result of the arrangement of the weighing mechanism according to the invention, the available space within the housing below the drum is utilised in the most efficient manner thereby providing for a rational construction and a substantial reduction of the dimensions of the scale.

From the description of the component parts above, it is apparent that there has been provided a scale for weighing objects, which scale is unique and which may be most compactly housed. In operation, an object to be weighed would be placed on weighing plate 2 or weighing plate 3. Two weighing plates 2 and 3 are provided in order that objects with weights of different magnitudes may be accommodated. Plate 2, being closer to the fulcrum, can be used for heavier objects, for example, in the range 1–10 kg., while plate 3 can be used for lighter objects, as in the range 0–1 kg. In either case, the interaction of component parts would be the same. This being understood, it will be assumed in the succeeding description of operation of the machine that weighing plate 2 is used. When an object is placed on plate 2, horizontality of that plate is maintained because bracket 4, 9 is pivotably mounted on knife edge bearings 64 and 98, and is also pivotably connected through upright 15 to fixed point connection 170. It will be appreciated that such an expedient is necessary because application of an object to plate 2 will cause downward motion of the main scale beam arms 6 and 8.

Upon such downward movement of the main scale beam tension is applied to band 132, causing rotation of the pendulum about the knife edge support 131. The dash pot 19 provides a stabilizing effect to movement of the pendulum. The extent to which the main scale beam will be depressed upon application of an object to plate 2 is thus governed by the main scale beam counterweight 7 and the counterweighted pendulum. The extent of depression of the main scale beam determines the weight for the object, and this is recorded by imparting rotary movement to the drum 1 from the main scale beam through the driving means consisting of the toothed rod 11 mounted on rear arm 8, and the pinion 12 mounted upon the shaft 111 upon which the drum 1 is also mounted.

I claim:

1. A pendulum scale comprising a base plate, a housing upstanding along one edge of said base plate, an indicator drum rotatably disposed within said housing, a main scale beam having a rear arm and a front arm, said arms being disposed parallel to the longitudinal axis of said drum, a pendulum rotatably disposed above said beam and connected therewith, driving means interconnecting said beam and said drum, a pair of weighing plate supporting brackets extending laterally across said rear and front arms and being pivotally mounted thereon, an upright support on each of said brackets, substantially horizontal stay rods to which said upright supports are pivotally connected, the rear portions of said brackets, said upright supports, said horizontal stay rods, said rear arm, said driving means, and said pendulum being situated within said housing substantially beneath said drum.

2. A scale as claimed in claim 1 wherein said rear arm and said front arm of said main scale beam are interconnected, said rear arm being situated immediately below said indicating drum and said front arm being situated towards the front of said scale, and including bearings on said front and rear arms upon which said brackets are pivotally mounted.

References Cited in the file of this patent

UNITED STATES PATENTS

| | | |
|---|---|---|
| 2,397 | Dole | Dec. 23, 1841 |
| 1,078,416 | Charet | Nov. 11, 1913 |
| 1,237,706 | Schaper | Aug. 4, 1917 |
| 1,471,956 | Gunther | Oct. 23, 1923 |
| 1,791,951 | Bryce | Feb. 10, 1931 |
| 2,558,162 | Williams | June 26, 1951 |